(12) United States Patent
Kim et al.

(10) Patent No.: US 7,720,483 B2
(45) Date of Patent: May 18, 2010

(54) APPARATUS AND METHOD FOR ASSIGNING SUB-CHANNELS IN AN OFDMA SYSTEM

(75) Inventors: Dong Hun Kim, Seongnam-si (KR); Jung Yun Lee, Anyang-si (KR); Keun Young Kim, Seongnam-si (KR)

(73) Assignee: LG-Nortel Co., Ltd., Seoul (KR)

( * ) Notice: Subject to any disclaimer, the term of this patent is extended or adjusted under 35 U.S.C. 154(b) by 695 days.

(21) Appl. No.: 11/545,602

(22) Filed: Oct. 11, 2006

(65) Prior Publication Data

US 2007/0081491 A1 Apr. 12, 2007

(30) Foreign Application Priority Data

Oct. 12, 2005 (KR) .................. 10-2005-0095938

(51) Int. Cl.
*H04W 40/00* (2009.01)
*H04W 72/00* (2009.01)
*H04W 4/00* (2009.01)

(52) U.S. Cl. .................. 455/447; 455/450; 370/329; 370/341

(58) Field of Classification Search .................. 455/450, 455/447, 453; 370/328–330, 341, 319, 344
See application file for complete search history.

(56) References Cited

U.S. PATENT DOCUMENTS

2003/0169681 A1* 9/2003 Li et al. .................. 370/203
2005/0169229 A1* 8/2005 Cho et al. .................. 370/344

* cited by examiner

*Primary Examiner*—George Eng
*Assistant Examiner*—Chayce Bibbee
(74) *Attorney, Agent, or Firm*—KED & Associates, LLP

(57) ABSTRACT

A sub-channel assignment apparatus and method of minimizing interference caused by sub-channel frequency overlaps when assigning sub-channels for sectors of a base station in an OFDMA system of a FDMA type. The apparatus includes: a plurality of sector channel management parts that assign at least one channel having assignable channel indexes in response to requests from users in a sector managed by the sector channel management part, and report sector load information regarding the total number of the requests from the users in the sector; and a channel assignment scheduler for using the sector load information reported from each channel management part to calculate the number of assignable channels per class for each of the sectors, and determines the assignable channel indexes per class for each of the sectors according to the number of assignable channels, and forwards the assignable channel indexes to each of the sector channel management parts.

13 Claims, 11 Drawing Sheets

APPARATUS AND METHOD FOR ASSIGNING SUB-CHANNELS IN AN OFDMA SYSTEM

This Non-Provisional Application claims priority under 35 U.S.C. §119(a) to Korean Patent Application No. 10-2005-0095938 filed in Korea on Oct. 12, 2005. Which is hereby incorporated by reference.

BACKGROUND OF THE INVENTION

1. Field of the Invention

The present invention relates to an OFDMA (Orthogonal Frequency Division Multiplexing Access) system, and more particularly to an apparatus and method for minimizing interference caused by sub-channel frequency overlaps when assigning sub-channels for sectors of a base station in an OFDMA system of a FDMA (Frequency Division Multiple Access) type.

2. Background of the Related Art

Recent advances in mobile communication technologies have led to a move from using analog methods to digital methods in signal processing. Also, in addition to voice and text communication services, multimedia communication services are now also provided for commercial use. In line with such progress, there has been a growing interest in the $4^{th}$ generation communication system, which establishes a more effective communication environment based on systematic inter-operations between a mobile communication system and a radio access and wide-band wired system.

Also, an OFDM transmission method is being proposed as a radio transmission method in order to enable various services to be provided in the $4^{th}$ generation communication system. The basic principle of the OFDM transmission method is to transform data rows inputted in series into a plurality of parallel data rows so as to separately carry each of the parallel data on a separate sub-carrier. In such a case, the frequency of the sub-carriers must be selected to maintain orthogonality between the sub-carriers, wherein such orthogonality allows each of the sub-carriers to overlap in the spectrum region.

Also, as for the $4^{th}$ generation communication system based on the prior OFDM transmission method, an OFDMA technology based on the OFDM system has been proposed as a multiple user access method in order to satisfy various QoS (Quality of Service) requirements, i.e., to maintain service quality while supporting various types of services and applications. The OFDMA method has the advantage of providing frequency and time in accordance with the user's requests by dividing the frequency band and time.

Further, since the same medium (channel) is shared by a plurality of users, the interference from neighboring cells or sectors greatly affects the communication quality. Thus, in order to reduce the interference, a FDMA based system uses a frequency reuse factor of $1/7$ as a default value, while a CDMA based system employs power control methods, for example. In contrast, the OFDMA system aims to use 1 as its frequency reuse factor. However, this inevitably leads to the interference phenomenon caused by the sub-carrier frequency overlap when there is an increase in the number of users in the multiple-sector environment.

That is, in the multiple sector (or cell) environment exemplified in FIG. 1, the sub-carriers will inevitably be assigned to multiple sectors or cells when a sum of cell loads of each sector constituting the base station is greater than 1. This requires a resource assignment method, which is different from the prior methods, in order to reduce the interference effect of these multiply assigned sub-carriers.

Also, prior OFDMA systems assign resources by unit of sub-channels consisting of a combination of sub-carriers and can be classified as PUSC (Partially Used Sub Carrier), FUSC (Fully Used Sub Carrier) or Band AMC (Band Adaptive Modulation Coding) types, etc. according to their sub-channel combination type. The PUSC and FUSC types are designed to avoid the same sub-carriers from being in proximity with each other when preparing the sub-channels to obtain frequency diversity. The Band AMC type is designed to allow the sub-carriers to be in proximity with each other when preparing the sub-channels to maximize the utilization of a change in the channel. However, conventionally, the assignment of the combined sub-channels is not managed by a single base station or controller, but rather independently by each sector, such that the problem of the interference caused by frequency overlap (i.e., sub-carrier overlap) arises.

FIG. 2 is a diagram illustrating a case of sub-channels randomly assigned in a conventional OFDMA system. The first sub-channel assignment method illustrated in FIG. 2 is a conventional random assignment method. When the total sum of the cell loads of each sector is greater than 1 ($1/2+1/2+1/2=1.5$), not only are there sub-channels of class 0 which are not assigned to any of the sectors (channel indexes 43-48), but there are also a lot of sub-channels that are inefficiently assigned. This increases the number of sub-channels of class 2 (a group of sub-channels assigned to 2 sectors, channel indexes 7-18, 25-30) and the number of sub-channels of class 3 (a group of sub-channels assigned to all sectors, channels indexes 1-6). Thus, the interference phenomenon caused by the frequency overlap cannot be efficiently managed.

SUMMARY OF THE INVENTION

Embodiments according to the present invention provide an OFDMA system with a base station or controller adapted to collect and analyze information on used channels and load of each sector to assign sub-channels to each sector.

Embodiments according to the present invention also provide an OFDMA system that performs sub-channel assignment at a base station or controller such that no sub-channel is multiply assigned to the neighboring sectors when the cell load of the system is low, and such that interference effects caused by the frequency overlap of the sub-carriers are minimized when the cell load is above a critical point where the assignment of the sub-carriers of the same frequency to the multiple sectors or cells is needed.

Embodiments according to the present invention further provide an OFDMA system with a base station or controller that provides faster channel assignment scheduling and maximum utilization efficiency of the radio resource by using a quantitative value on the ratios for assigning the sub-channels for each sector, wherein the ratios are based on the channel and load information of each sector.

According to one embodiment according to the present invention, an apparatus for assigning sub-channels in an OFDMA system with a plurality of sectors is provided. The apparatus may comprise: a plurality of sector channel management parts each for assigning channels having assignable channel indexes in response to requests from users in a sector managed by the sector channel management part, and reporting sector load information regarding the total number of the requests from the users in the sector; and a channel assignment scheduler for using the sector load information reported from each of the channel management part to calculate the number of assignable channels per class for each of the sectors, determining the assignable channel indexes per class for each of the sectors according to the numbers of assignable channels, and forwarding the assignable channel indexes to each of the sector channel management parts, wherein said class is a group consisting of channels to be assigned to a same number of sectors.

According to another embodiment according to the present invention, a method for assigning sub-channels in an OFDMA system is provided. The method may comprise: receiving reports from each of a sector channel management part on sector load information regarding the number of channel assignment requests from users in sectors managed by each of the sector channel management parts; calculating the number of assignable channels per class for each of the sectors by using the sector load information of each of the sectors; determining assignable channel indexes per class for each of the sectors according to the number of assignable channels per class for each of the sectors; and forwarding each of the channel indexes to corresponding sector channel management parts, wherein the class is a group consisting of channels assigned to the same number of sectors.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE PREFERRED EMBODIMENTS

Henceforth, the preferred embodiments of the present invention will be described in detail in connection with the attached drawings.

Figure 3:
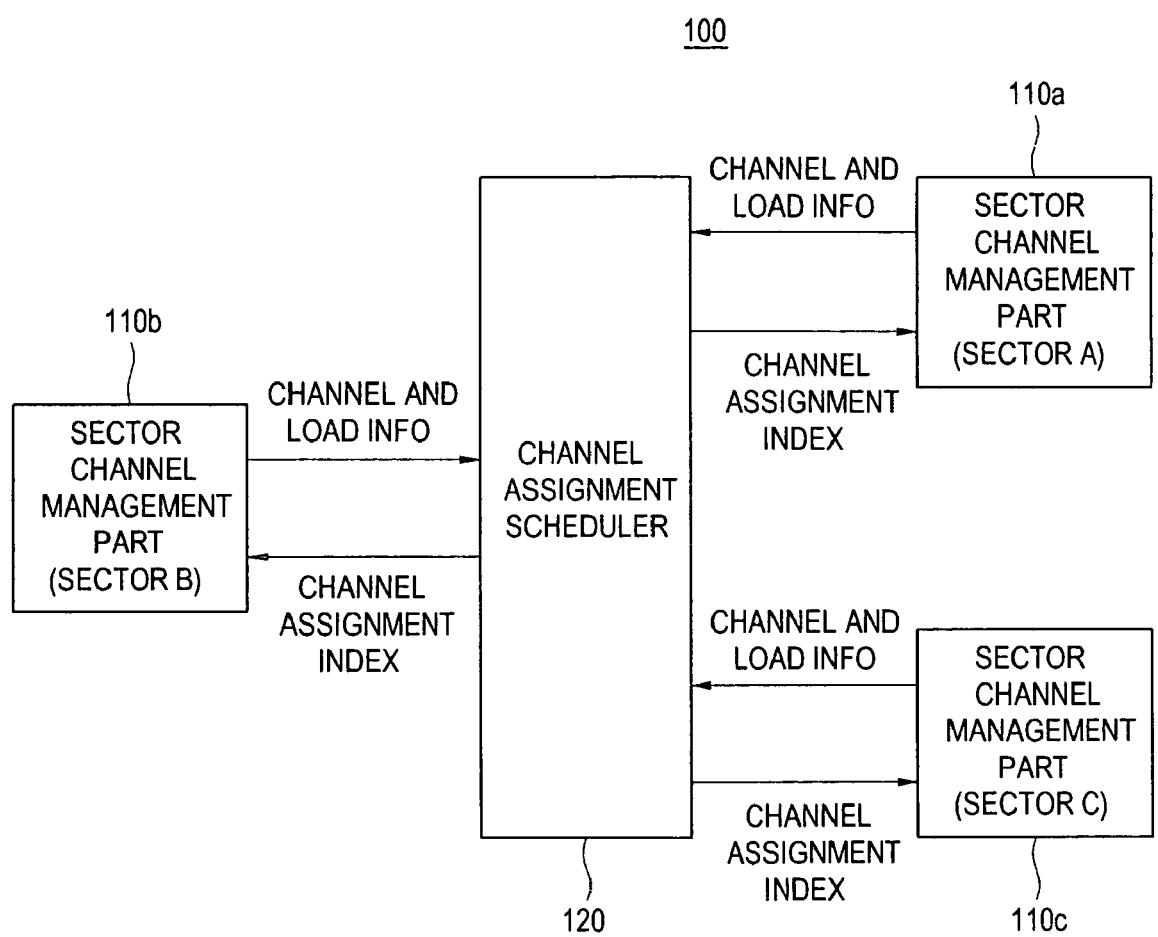
FIG. 3 is a diagram illustrating a sub-channel assigning apparatus in an OFDMA system according to an exemplary embodiment of the present invention.

FIG. 3 is a diagram illustrating a sub-channel assigning apparatus in an OFDMA system according to an exemplary embodiment of the present invention. In the exemplary embodiment of the present invention, sector (or cell) load information and channel quality information are completely managed in a base station or controller to thereby realize a sub-channel assignment function that minimizes the interference phenomenon caused by the frequency overlap. Such sub-channel assignment function can be realized based on an example OFDMA system as illustrated in FIG. 3.

Referring more particularly to FIG. 3, a sub-channel assignment apparatus 100 according to an exemplary embodiment of the present invention may comprise: a plurality of sector channel management part 110a, 110b, 110c for performing sub-channel assignment and management functions for each sector and for creating and reporting the sector load information and the channel quality information of the corresponding sector on every frame; and a channel assignment scheduler 120 for collecting and analyzing the sector load information and the channel quality information reported on every frame from each of the sector channel management parts 110a, 110b, 110c, thereby calculating the number of assignable channels per class for each of the sectors and the number of assignable channels per the sectors to be assigned for the respective classes. Such information can then be forwarded on the assignable channel indexes per class for each of the sectors and/or information on the assignable channel indexes per sector for each of the classes to each of the sector channel management parts, thus controlling the sub-channel assignment.

Herein, the class refers to groups of sub-channels classified from a pool of total sub-channels that can be assigned to the sectors by the number of sectors the sub-channel is assigned in the base station or controller. For example, assuming that three sectors (sector A, sector B, sector C) are managed by the base station, the sub-channels can be classified into class 0 (including a group of sub-channels not assigned to any of the three sectors), class 1 (including a group of sub-channels assigned to only one of the three sectors), class 2 (including a group of sub-channels assigned to two of the three sectors), and class 3 (including a group of sub-channels assigned to all three sectors).

Each sector channel management part 110a, 110b, 110c reports the sector load information, which is proportional to the number of channel assignment requests by the users located, among a plurality of sectors managed by the base station in the sector managed by the respective sector management part (preferably, the channel quality information containing signal to noise ratio information for channels currently in use to channel assignment scheduler 120 on every frame). Each sector channel management part 110a, 110b, 110c performs sub-channel assignment in response to requests from each user located in the sector managed by the respective sector channel management part according to the information on the assignable channel indexes per class for each of the sectors transmitted on every frame from channel assignment scheduler 120. Preferably, when assigning the sub-channel, each sector channel management part 110a, 110b, 110c sequentially assigns the sub-channels starting from the sub-channels of a class with sub-channels assigned to a less number of sectors. For example, when assigning the sub-channels, each sector channel management part 110a, 110b, 110c first assigns the sub-channels of a class with sub-channels not assigned to multiple sectors according to the information on the assignable channel indexes per class, followed by the sub-channels of a class with sub-channels assigned to multiple sectors according to the information on the assignable channel indexes classified by the sectors to be assigned for the respective classes. In addition to the channel index information, each sector channel management part 110a, 110b, 110c can receive information on the number of assignable channels per each class and the number of assignable channels per sectors to be assigned for the respective classes on every frame.

The channel assignment scheduler 120 located in the base station or controller controls each sector channel management part 110a, 110b, 110c to thereby control the sub-channel assignment for each of the sectors managed by the base station on every frame. The channel assignment scheduler collects and analyzes the sector load information reported from each sector channel management part 110a, 110b, 110c on every frame and calculates the number of assignable channels per class for each of the sectors and the number of assignable channels per sectors to be assigned for the respective classes. Also, the channel assignment scheduler 120 determines the assignable channel indexes per class for each of the sectors and per sectors to be assigned for the respective classes according to the calculation result on the number of assignable channels and the channel quality information reported with the sector load information from each of the sector channel management parts. The channel assignment scheduler 120 forwards the assignable channel indexes information per class for each of the sectors and/or per sectors to be assigned for the respective classes determined as such, thereby controlling the sub-channel assignment of each sector channel management part 110a, 110b, 110c.

In the base station consisting of aforementioned multiple sectors, if the sum of the cell loads of each sector is greater than 1, then a sub-channel that is multiply assigned (i.e., sub-channel assigned to multiple sectors) inevitably arises. Thus, in order to minimize the interference phenomenon caused by the frequency overlap of the sub-channels assigned to the multiple sectors, the number of assignable channels (i.e., number of sub-channels) per class and/or per sector to be assigned for each of the classes is calculated. In such a case, the number of sub-channels of class 0 should be '0' to maximize the sub-channel assignment efficiency. Also, the number of sub-channels multiply assigned to other sectors, such as the sub-channels of class 2 or 3, should be minimized in order to reduce the sub-channel interference.

The detailed description on the sub-channel assignment method in the OFDMA system of such construction, especially those with 3 sectors (e.g., sector A, sector B and sector C) under the base station, is provided below.

Figure 4:
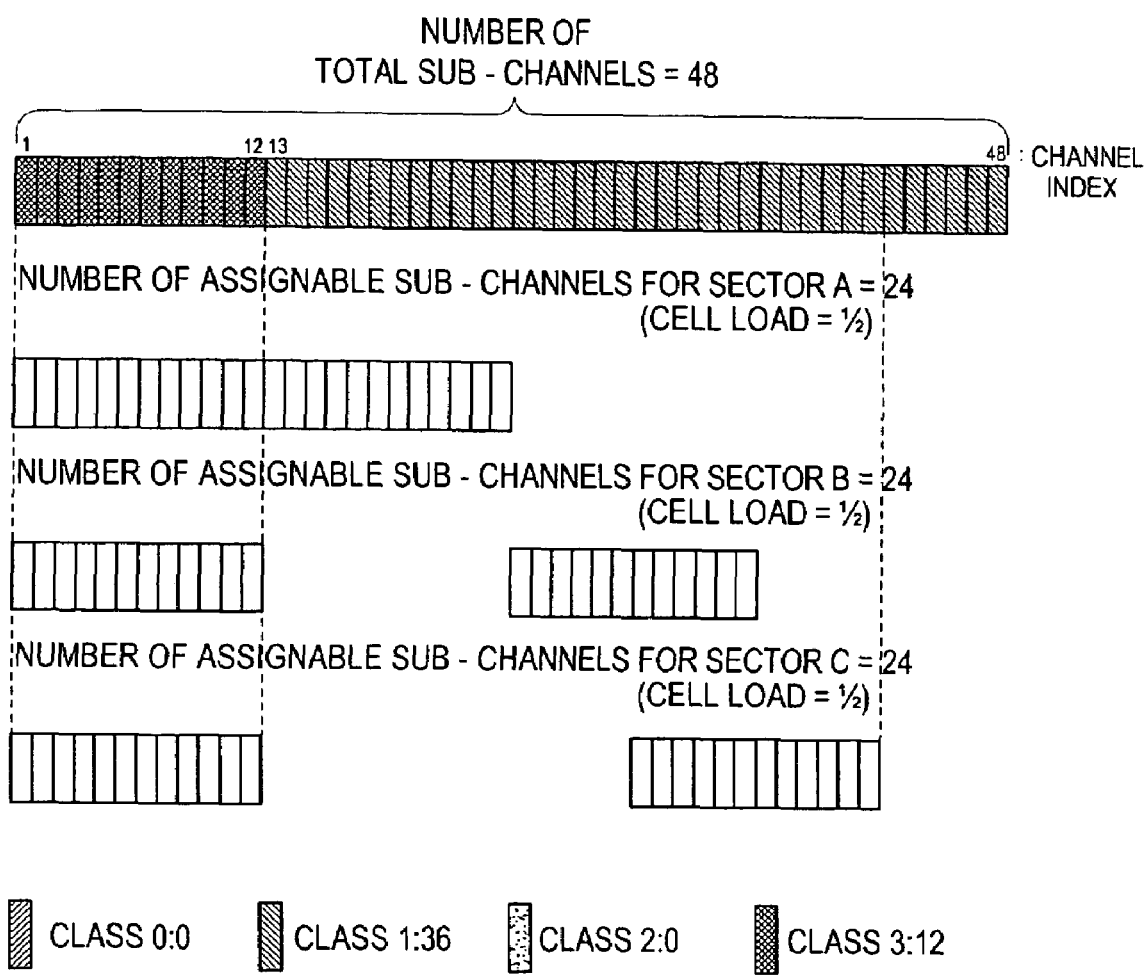
FIG. 4 is a diagram illustrating a case where sub-channels are assigned to set the number of sub-channels of Class 0 to '0' and the number of sub-channels of Class 3 to maximum according to an exemplary embodiment of the present invention.
Figure 5:
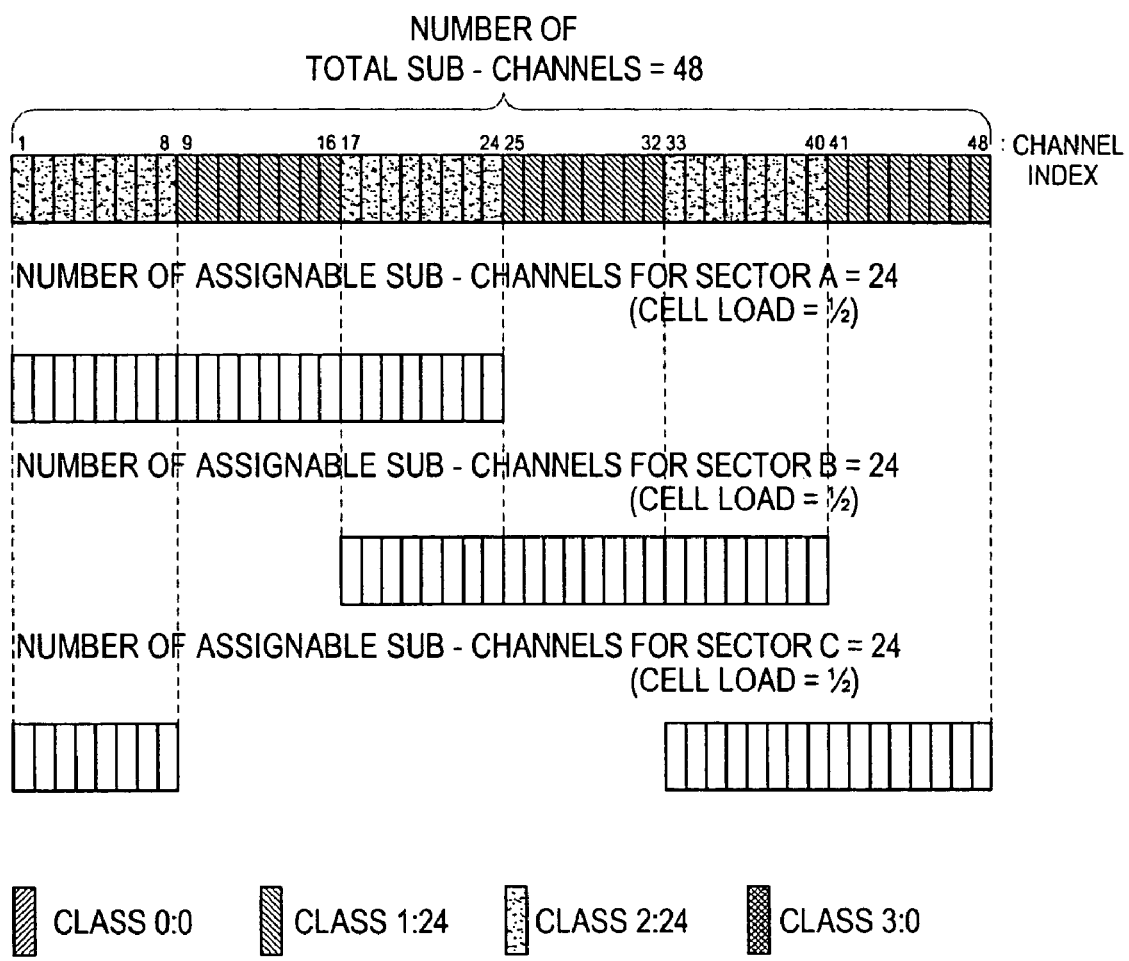
FIG. 5 is a diagram illustrating a case where sub-channels are assigned to set the number of sub-channels of Class 0 to '0' and the number of sub-channels of Class 3 to minimum according to an exemplary embodiment of the present invention.

FIG. 4 is a diagram illustrating a case where the sub-channels are assigned to set the number of sub-channels of class 0 to '0' and the number of sub-channels of class 3 to maximum, according to an exemplary embodiment of the present invention. FIG. 5 is a diagram illustrating a case where the sub-channels are assigned to set the number of sub-channels of class 0 to '0' and the number of sub-channels of class 3 to minimum according to an exemplary embodiment of the present invention.

In the exemplary method illustrated in FIG. 4, the number of sub-channels of class 3 (a group of sub-channels assigned to all the sectors) are inefficiently large. Thus, a portion of users assigned to the sub-channels of class 3 experiences heavy interferences due to the frequency overlap with the users of other sectors. On the other hand, the other users are assigned to the sub-channels of class 1, thus enabling communication to be free from the interference caused by the frequency overlap.

Another exemplary sub-channel assignment method illustrated in FIG. 5 performs the sub-channel assignment with regards to the cell load of each sector. The operation of each sector channel management part and the channel assignment scheduler is explained in detail as follows.

Figure 1:
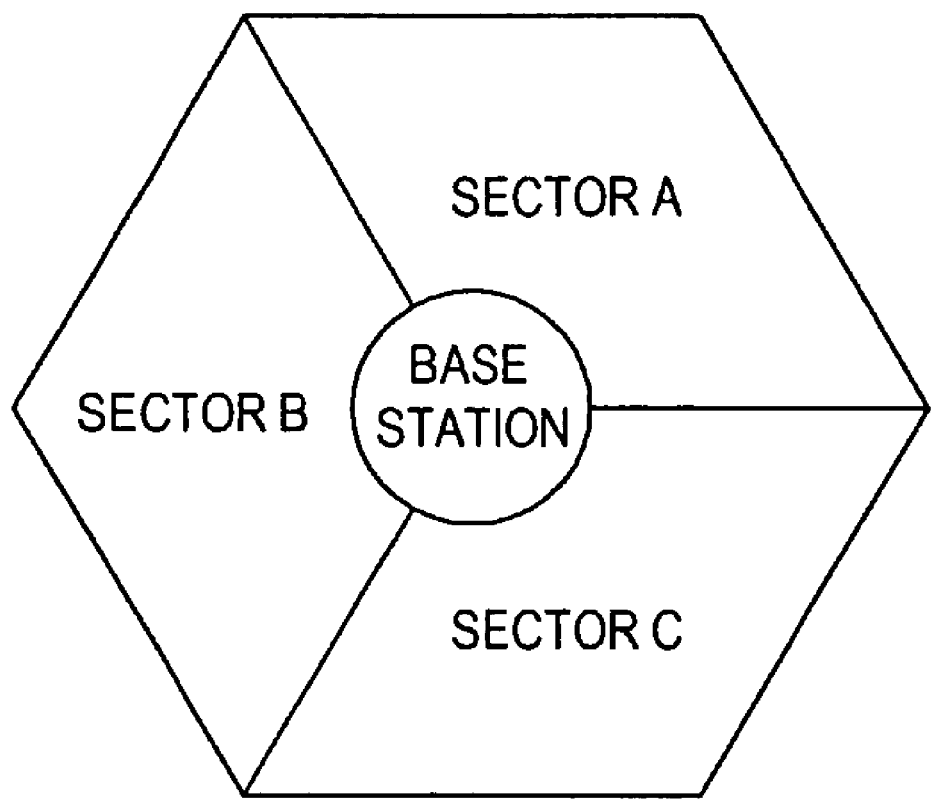
FIG. 1 is a diagram illustrating a multiple sector environment of a conventional base station.
Figure 2:
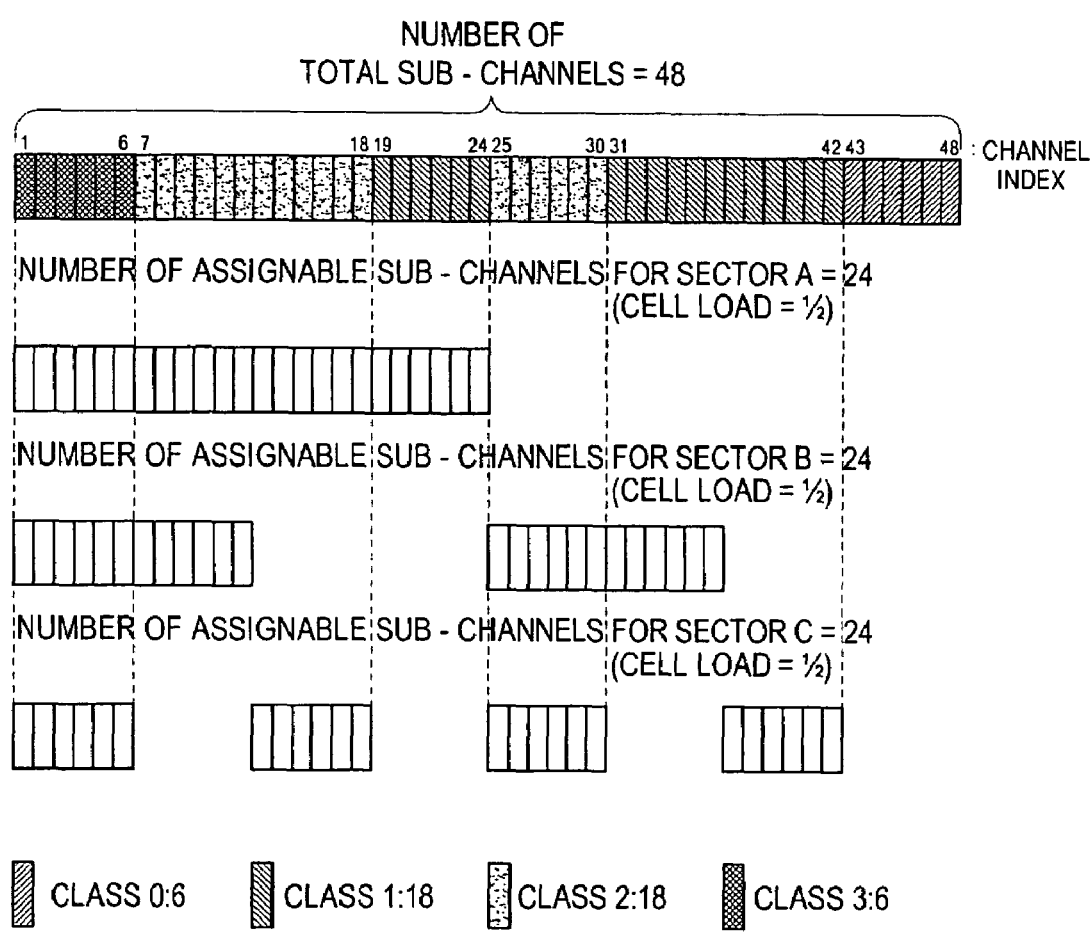
FIG. 2 is a diagram illustrating a case of sub-channels randomly assigned in a conventional OFDMA system.

For example, as to the cell construction shown in FIG. 1, the cell loads of sectors A, B and C, which are managed by the base station, are defined as Wa, Wb and Wc, respectively. In this instance, the channel assignment scheduler 120 collects and analyzes the load information reported from each of the sectors. When the sum of the cell loads is smaller than or equal to 1 (Wa+Wb+Wc<=1), this implies that the total number of channels requested by all the users in the sectors are smaller than or equal to the total number of assignable channels. Thus, when assigning the sub-channels, the sub-channels can be assigned without any sub-channels being multiply assigned. That is, the number of sub-channels of classes 2 and 3 (a group of sub-channels multiply assigned to sectors 2 and 3, respectively) can be made to '0'. Also, the number of sub-channels of class 0 (a group of sub-channels assigned to only one sector) can be made to correspond to the cell loads of each sector. By doing so, the assignable channel indexes per each sector and per each class can be determined. For example, assuming that the cell load of sector A (Wa) is $10/48$, the cell load of sector B (Wb) is $15/48$ and the cell load of sector C (Wc) is $20/48$, since the total cell load of all sectors (Wa+Wb+Wc) is smaller than 1 (the total cell load is $45/48$), the number of sub-channels of classes 2 and 3 will be made to 0 while the number of sub-channels of class 1 is calculated to be the value matching the total cell load for all the sectors (that is, 45). Among the sub-channels of class 1, 10 channel indexes are assigned to sector A, 15 channel indexes are assigned to sector B, and 20 channel indexes are assigned to sector C. Then, the information per sector and per class are forwarded to the corresponding sector channel management parts 110a, 110b, 110c, to thereby control the sub-channel assignment, such that each sector channel management part does not multiply assign the sub-channels.

Figure 6:
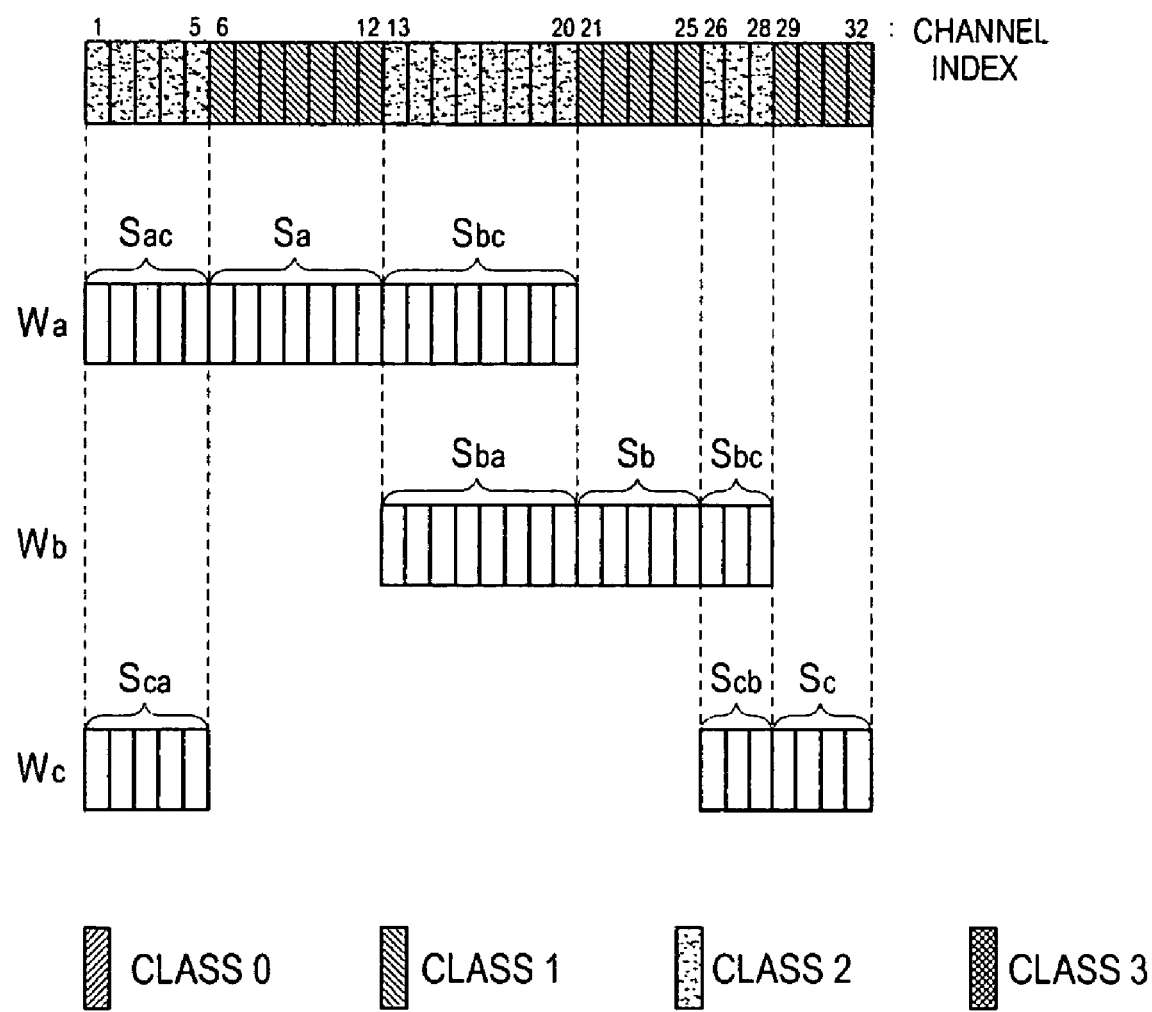
FIGS. 6 and 7 are diagrams exemplifying the sub-channel assignment method of FIG. 5 when the sum of the cell loads of each sector is greater than 1 but smaller than or equal to 2.
Figure 7:
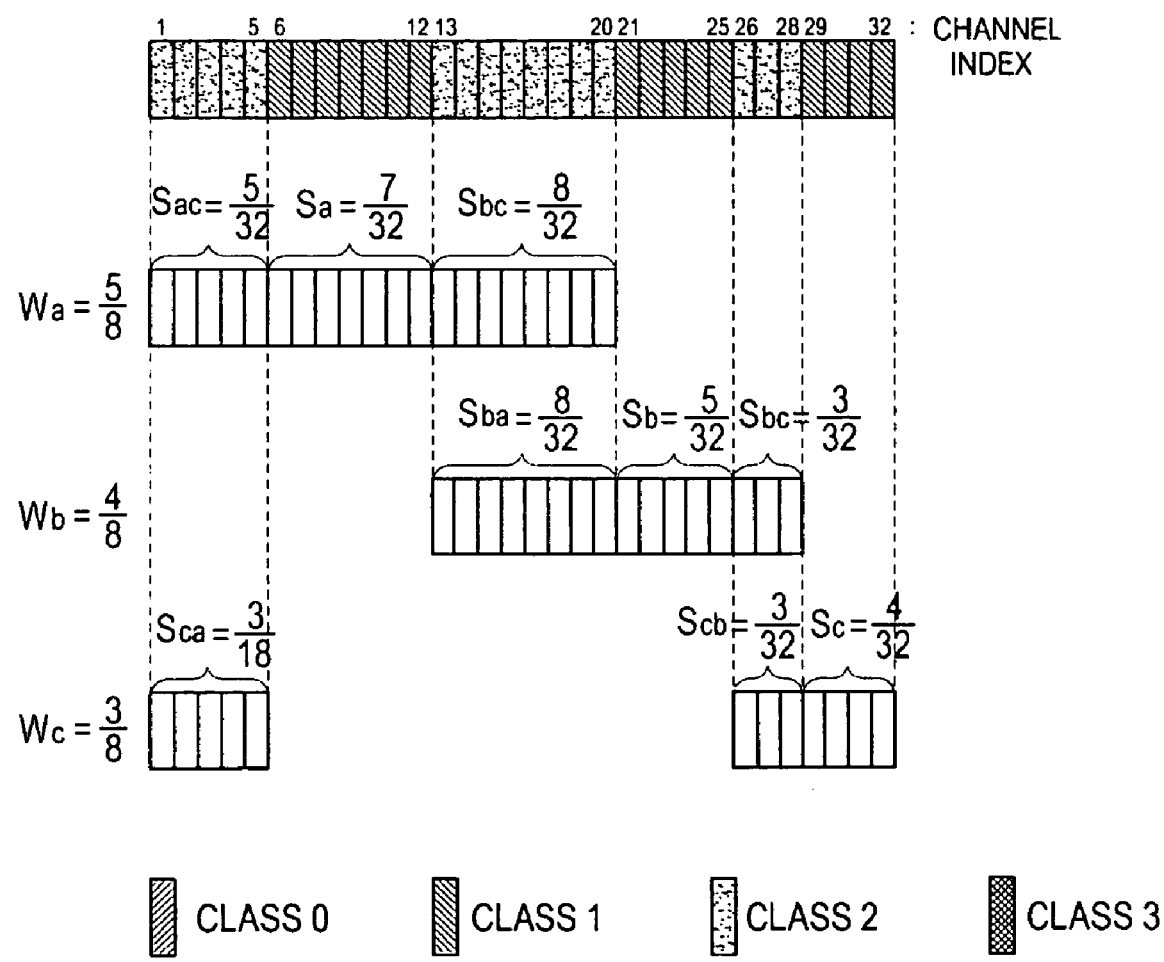

FIGS. 6 and 7 are diagrams exemplifying the sub-channel assignment method of FIG. 5 when the sum of the cell loads of each sector is greater than 1 but smaller than or equal to 2. When the channel assignment scheduler 120 collects and analyzes the load information reported from each sector channel management part to find that the total sum of the cell loads of each of the sectors is greater than 1 but smaller than or equal to 2 (that is 1<Wa+Wb+Wc≦2), this implies that the total number of channels requested by all the sectors is greater than the number of total assignable channels and thus the sub-channel assignment should be performed in consideration of the interference due to the frequency overlap.

With this in mind, as exemplified in FIG. 6, the number of sub-channels of class 1 assigned only to one of sectors A, B and C is respectively defined as Sa, Sb and Sc. In order to maintain the ratio of the number of sub-channels of class 1 for each sector (that is, the ratio of Sa, Sb and Sc) equal to the ratio of the number of sub-channels of class 2 (the group of sub-channels multiply assigned to 2 sectors), the ratio of Sa, Sb and Sc is made to follow the ratio of the cell loads of each sector Wa, Wb and Wc.

By doing so, the total number of sub-channels of class 1 becomes Sa+Sb+Sc, and the total number of sub-channels of class 2 becomes $$\frac{(Wa - Sa) + (Wb - Sb) + (Wc - Sc)}{2}.$$

In such a case, to make the number of sub-channels of class 0 (the group of sub-channels not assigned to any of the sectors) to 0, the condition $$Sa + Sb + Sc + \frac{(Wa - Sa) + (Wb - Sb) + (Wc - Sc)}{2} = 1$$

must be satisfied. Since the ratio of the number of sub-channels of class 1 is equal to the ratio of the cell loads of each sector (that is, 'Sa:Sb:Sc=Wa:Wb:Wc'), the number of sub-channels of each sector becomes $$Sa = \frac{Wa}{Wa + Wb + Wc} S,$$
$$Sb = \frac{Wb}{Wa + Wb + Wc} S,$$
$$Sc = \frac{Wc}{Wa + Wb + Wc} S.$$

Also, since the total number of sub-channels of class 1 is 'S=2−(Wa+Wb+Wc),' the number of class 1 sub-channels of each sector calculated above, Sa, Sb, Sc, can be represented as equation 1 shown below.

$$Sa = \frac{Wa(2 - (Wa + Wb + Wc))}{Wa + Wb + Wc}$$
$$Sb = \frac{Wb(2 - (Wa + Wb + Wc))}{Wa + Wb + Wc} \quad \text{[Equation 1]}$$
$$Sc = \frac{Wc(2 - (Wa + Wb + Wc))}{Wa + Wb + Wc}$$

The number of class 2 sub-channels of sector A multiply assigned to sector B is defined as Sab. The number of sub-channels multiply assigned to other sectors can be similarly defined. In summary, they are defined as Sab, Sac, Sba, Sbc, Sca, Scb, wherein 'Sab=Sba', 'Sac=Sca', 'Sbc=Scb.'

To illustrate the sub-channel assignment procedure based on the above definitions, all sub-channels for sector A are first assigned, starting from an initial sub-channel assignment point for the total sub-channels wherein, for the cell load of sector A (Wa), the sub-channel multiply assigned to sector (Sac) is assigned first, the sub-channels only assigned to sector A (Sa) are then assigned, and the sub-channels multiply assigned to sector B (Sab) are assigned last.

After all the sub-channels for sector A have been assigned, the sub-channels for sector B are assigned. The sub-channels for sector B are assigned next to the position of the sub-channels multiply assigned to sector C (Sac) and the sub-channels only assigned to sector A (Sa) among the cell load of sector A (Wa). The sub-channels multiply assigned to sector A (Sba) are assigned first, the sub-channels assigned only to sector B are then assigned, and then the sub-channels multiply assigned to sector C (Sbc) are assigned last.

After all the sub-channels of sector B are assigned, the sub-channels of sector C are sequentially assigned. As explained above, the sub-channels for sector C are assigned to the position next to the sub-channels multiply assigned to sector A (Sba) and the sub-channels only assigned to sector B (Sb) among the cell load of sector B (Wb). The sub-channels multiply assigned to sector B (Scb) are first assigned, then the sub-channels only assigned to sector C (Sc) are assigned, and lastly, starting from the initial sub-channel assignment point, the sub-channels multiply assigned to sector C (Sca) are assigned.

According to the aforementioned sub-channel assignment results, three equations, i.e., (1) Sac+Sa+Sab=Wa, (2) Wa+(Wb−Sab)+Sc=1 and (3) Wa+Sb+Sbc+Sc=1, can be obtained. Using the above equations, the number of sub-channels multiply assigned to other sectors can be derived for each sector as shown in equation 2 shown below. In equation 2, Sab and Sba are each the number of sub-channels multiply assigned to sectors A and B, Sbc and Scb are each the number of sub-channels multiply assigned to sectors B and C, Sca and Sac are each the number of sub-channels multiply assigned to sectors C and A.

$$Sab=Sba=1-(Sa+Sb+Wc)$$
$$Sbc=Scb=1-(Sb+Sc+Wa)$$
$$Sca=Sac=1-(Sc+Sa+Wb) \quad \text{[Equation 2]}$$

When the sum of the cell loads of each of the sectors is greater than 1 but smaller than or equal to 2 (1<Wa+Wb+Wc≦2), the channel assignment scheduler 120 calculates the number of assignable channels per class for each of the sectors and the number of assignable channels per sectors to be assigned for the respective classes for every frame in a direction of minimizing the interference caused by the frequency overlap. Then, the channel assignment scheduler 120 determines the assignable channel indexes per class for each of the sectors and per sectors to be assigned for the respective classes according to the calculation results on the number of assignable channels.

For example, as illustrated in FIG. 7, when the cell load of sectors A, B and C are respectively ⅝, ⅘ and ⅜, the number of class 1 sub-channels for each sector (Sa, Sb Sc) can be calculated by using the aforementioned equation 1. Further, the number of sub-channels multiply assigned to other sectors for each of the sectors (Sab, Sac, Sba, Sbc, Sca and Scb) can be calculated by using the aforementioned equation 2.

The assignable channel indexes per class for each of the sectors and per sectors to be assigned for the respective classes are determined by the channel assignment scheduler 120, according to the calculated result for the number of assignable channels as shown below: For sector A, channel indexes 1-5, 13-20 are determined as assignable for the sub-channels of class 2 (Sab, Sac) and channel indexes 6-12 are determined as assignable for the sub-channels of class 1 (Sa), wherein such information on the assignable channel indexes are forwarded to the sector channel management part of sector A, 110a. For sector B, channel indexes 13-20, 26-28 are determined as assignable for the sub-channels of class 2 (Sba, Sbc) and channel indexes 21-25 are determined as assignable for the sub-channels of class 1 (Sb), wherein such information on the assignable channel indexes are forwarded to the sector channel management part of sector B, 110b. For sector C, channel indexes 1-5, 26-28 are determined as assignable for the sub-channels of class 2 (Sca, Scb) and channel indexes 29-32 are determined as assignable for the sub-channels of class 1 (Sc), wherein such information on the assignable channel indexes are forwarded to the sector channel management part of sector C, 110c.

Figure 8:
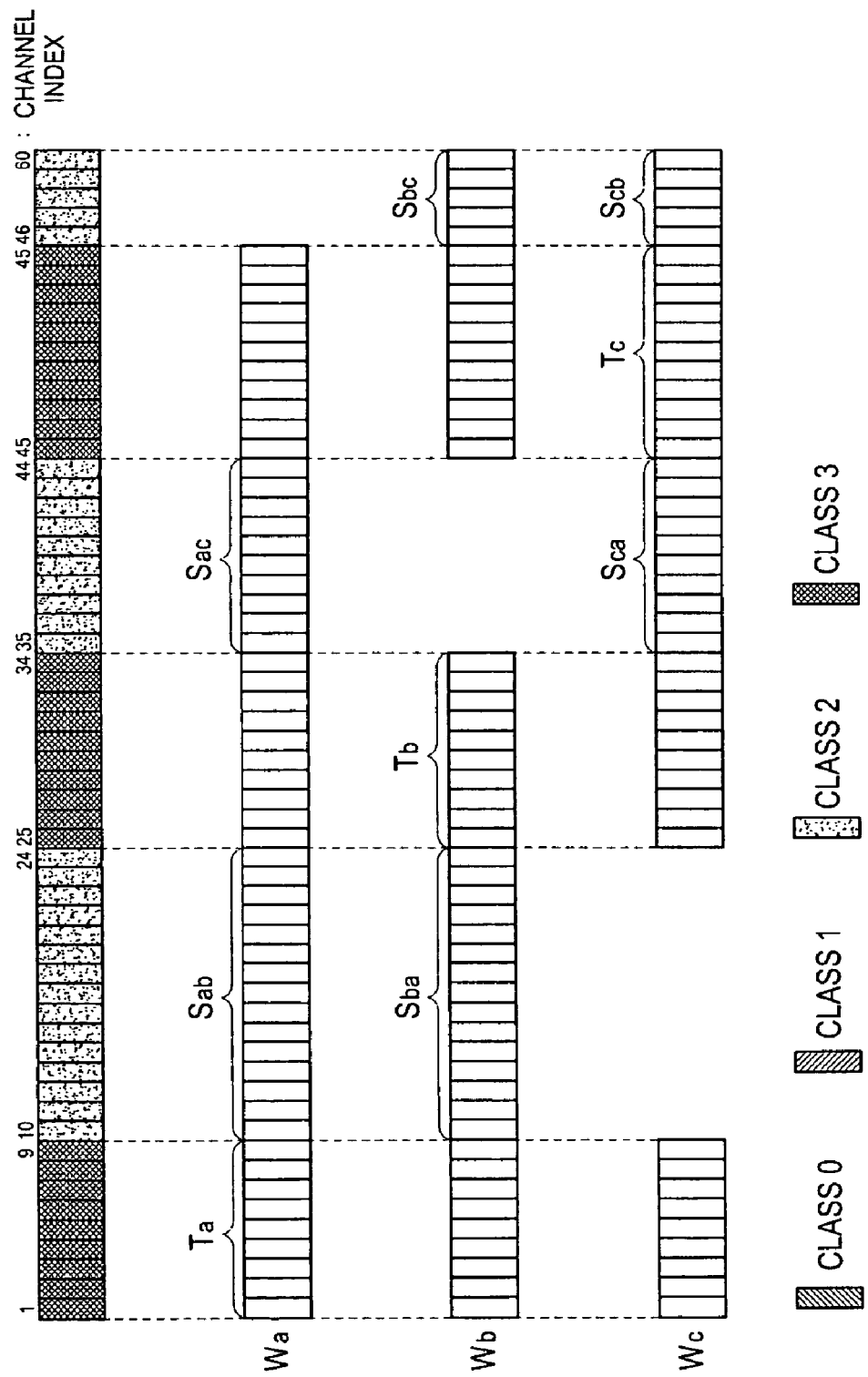
FIGS. 8 and 9 are diagrams exemplifying the sub-channel assignment method of FIG. 5 when the sum of the cell loads of each sector is greater than 2 but smaller than or equal to 3.
Figure 9:
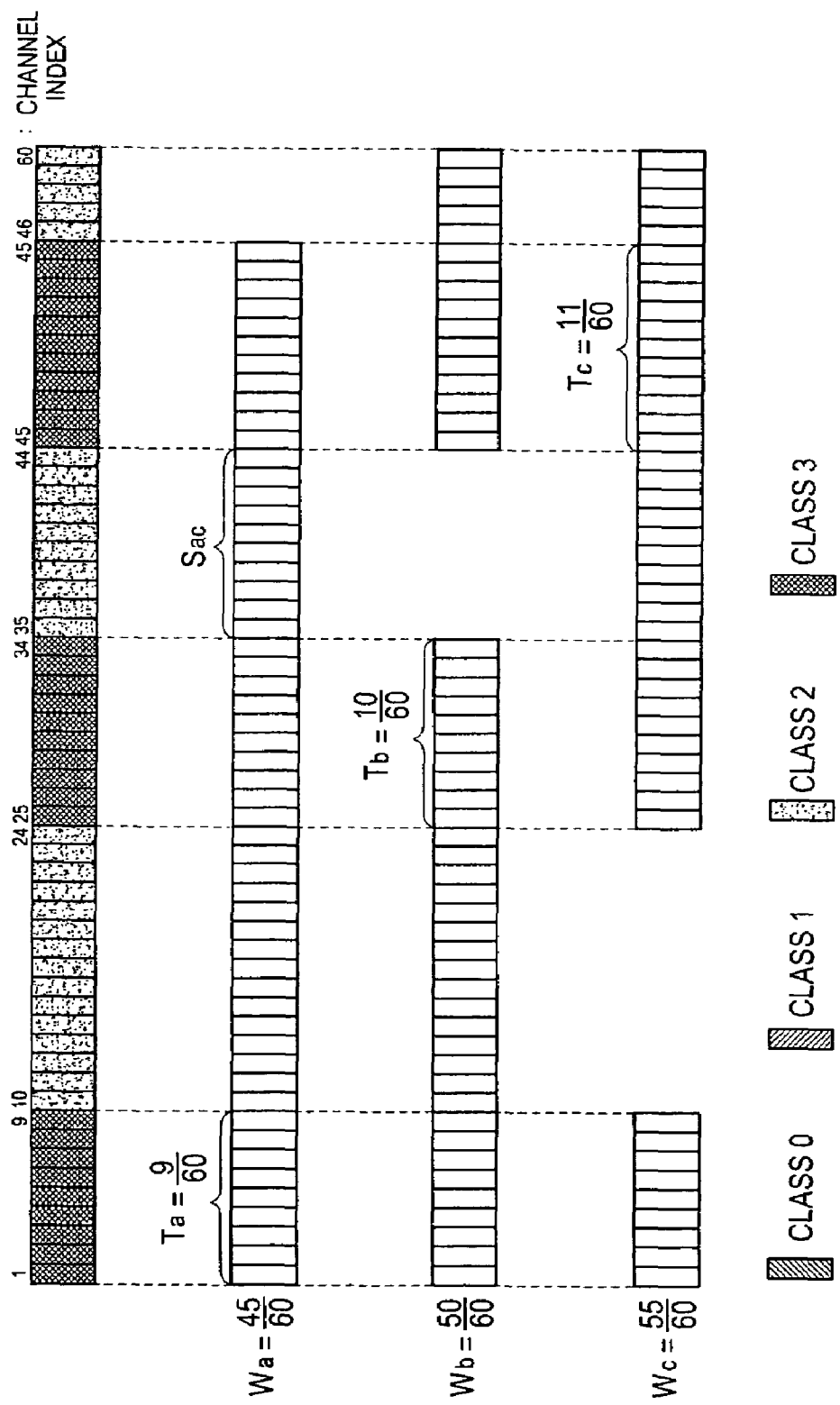

FIGS. 8 and 9 are diagrams exemplifying the sub-channel assignment method of FIG. 5 when the sum of the cell loads of each sector is greater than 2 but smaller than or equal to 3. When the channel assignment scheduler 120 collects and analyzes the load information reported from each sector channel management part 110a, 110b, 110c, to find that the sum of the cell loads of each sector is greater than 2 but smaller than or equal to 3 (that is, 2<Wa+Wb+Wc≦3), this implies that there must inevitably be the sub-channels of class 3 (group of sub-channels multiply assigned to 3 sectors). Thus, it is preferable to maximize the number of sub-channels of class 2 (sub-channels multiply assigned to 2 sectors) when assigning the sub-channels. To achieve this, preferably, the number of sub-channels of class 3 must be minimized. Also, the number of sub-channels of class 0 (sub-channels not assigned to any of the sectors) and class 1 (sub-channels assigned to only one of the sectors) must be '0'.

In this case, as illustrated in FIG. 8, assuming that the number of sub-channels of class 3 for each sector is Ta, Tb and Tc, the total number of the sub-channels of class 2 must be 1 at maximum.

Therefore, the condition $$\frac{(Wa - Ta) + Wb - Tb) + (Wc - Tc)}{2} = 1$$

is met. When examining the cell load of each sector, the cell load of sector A becomes 'Wa=Sab+Sac+Ta+Tb+Tc,' the cell load of sector B becomes 'Wb=Sba+Sbc+Ta+Tb+Tc,' and the cell load of sector C becomes 'Wc=Sca+Scb+Ta+Tb+Tc.' Herein, 'Sab, Sac, Sba, Sbc, Sca, Scb' correspond to the number of sub-channels multiply assigned to 2 sectors, which are different from each other, wherein 'Sab=Sba', 'Sac=Sca' and 'Sbc=Scb.'

Using the above equation for the cell loads of each sector to calculate the number of sub-channels of class 3, the equations $$Ta = \frac{Wa}{Wa + Wb + Wc}T,$$

$$Tb = \frac{Wb}{Wa + Wb + Wc}T, \text{ and}$$

$$Tc = \frac{Wc}{Wa + Wb + Wc}T$$

can be obtained. In such a case, since the total number of sub-channels of class 3 is 'T=Wa+Wb+Wc−2,' the number of class 3 sub-channels of each sector Ta, Tb, Tc can be represented by equation 3 shown below.

$$Ta = \frac{Wa(Wa + Wb + Wc - 2)}{Wa + Wb + Wc}$$ [Equation 3]

$$Tb = \frac{Wb(Wa + Wb + Wc - 2)}{Wa + Wb + Wc}$$

$$Tc = \frac{Wc(Wa + Wb + Wc - 2)}{Wa + Wb + Wc}$$

Further, as in the case where the sum of the cell loads of each sector is greater than 1 but smaller than or equal to 2, the number of sub-channels multiply assigned to other sectors in each sector can be found using equation 4 shown below. In equation 4 shown below, Sab and Sba are each the number of sub-channels multiply assigned to sectors A and B, Sbc and Scb are each the number of sub-channels multiply assigned to sectors B and C, and Sca and Sac are each the number of sub-channels multiply assigned to sectors C and A.

$$Sab = Sba = \frac{Wa + Wb - Wc - (Ta + Tb + Tc)}{2}$$ [Equation 4]

$$Sbc = Scb = \frac{Wb + Wc - Wa - (Ta + Tb + Tc)}{2}$$

$$Sca = Sac = \frac{Wc + Wa - Wb - (Ta + Tb + Tc)}{2}$$

When the sum of the cell loads of each sector is greater than 2 but smaller than or equal to 3 (that is, 2<Wa+Wb+Wc≦3), the channel assignment scheduler 120 calculates the number of assignable channels per class for each sector and the number of assignable channels per sectors to be assigned for the respective classes for every frame in a direction of minimizing the interference caused by the frequency overlap. Then, the channel assignment scheduler 120 determines the assignable channel indexes per class for each sector and per sectors to be assigned for the respective classes, according to the calculation results for the number of assignable channels.

For example, as illustrated in FIG. 9, when the cell load of sectors A, B and C are respectively 45/60, 50/60 and 55/60, the number of class 3 sub-channels for each sector (Ta, Tb, Tc) can be calculated by using the above equation 3. Further, the number of sub-channels multiply assigned to other sectors for each sectors Sab, Sac, Sba, Sbc, Sca, and Scb can be calculated by using the above equation 4.

The assignable channel indexes per class for each sector and per sectors to be assigned for the respective classes are determined by the channel assignment scheduler 120, according to the calculated results on the number of assignable channels as shown below: For sector A, channel indexes 1-9, 25-34 and 45-55 are determined as assignable, respectively, for the sub-channels of class 3, Ta, Tb, and Tc, while channel indexes 10-24, 35-44 are determined as assignable for the sub-channels of class 2 (Sab, Sac), wherein such information on the assignable channel indexes are forwarded to the sector channel management part 110a of sector A. For sector B, channel indexes 1-9, 25-34 and 45-55 are determined as assignable, respectively, for the sub-channels of class 3, Ta, Tb and Tc, while channel indexes 10-24, 56-60 are determined as assignable for the sub-channels of class 2 (Sba, Sbc), wherein such information on the assignable channel indexes are forwarded to the sector channel management part 110b of sector B. For sector C, channel indexes 1-9, 25-34 and 45-55 are determined as respectively assignable for the sub-channels of class 3, Ta, Tb, and Tc, while channel indexes 35-44, 56-60 are determined as assignable for the sub-channels of class 2 (Sca, Scb), wherein such information on the assignable channel indexes are forwarded to the sector channel management part 110c of sector C.

Also, in determining the assignable channel indexes per class for each sector and per sectors to be assigned for the respective classes, according to the calculated result for the number of assignable channels based on the aforementioned conditions, the channel assignment scheduler 120 determines the assignable channel indexes per class for each sector and per sectors to be assigned for the respective classes according to the channel information reported with the cell load information from each sector channel management part 110a, 110b, 110c (in addition to the above calculated information on the number of assignable channels).

That is, even though the channel assignment scheduler uses the above calculated information on the number of assignable channels to determine the assignable channel indexes per class for each sector and per sectors to be assigned for the respective classes, when the analyzed result of the channel information reported from each sector channel management part indicates that an arbitrary sub-channel in a certain sector has a low signal to noise ratio, the channel indexes are determined not to assign the said sub-channel once again to the said sector (that is, the sector having the low signal to noise ratio). On the other hand, when the analyzed result of the channel information reported from each sector channel management part indicates that an arbitrary sub-channel in a certain sector has a high signal to noise ratio, the channel indexes are determined to once again assign the said sub-channel to the said sector (that is, the sector having the high signal to noise ratio).

As such, after determining the assignable channel indexes per class for each sector and per sectors to be assigned for the respective classes for every frame, the channel assignment scheduler 120 forwards the channel index information to the corresponding sector channel management part 110*a*, 110*b*, 110*c* performing the sub-channel assignment and management function for the corresponding sector. Each sector channel management part 110*a*, 110*b*, 110*c* performs the sub-channel assignment requested by each user located in the sector, according to the assignable channel index information per each class and per sectors to be assigned for the respective classes forwarded from the channel assignment scheduler 120 for every frame.

In this case, it is preferable for each sector channel management part 110*a*, 110*b*, 110*c* to first assign the sub-channels corresponding to the assignable sub-channels of class 1 (group of sub-channels not multiply assigned to other sectors) among the assignable channels indexes for all classes and then assign the sub-channels corresponding to the assignable channel indexes of classes 2 and 3 (group of sub-channels multiply assigned to other sectors). This is to minimize the interference caused by the frequency overlap.

Figure 10:
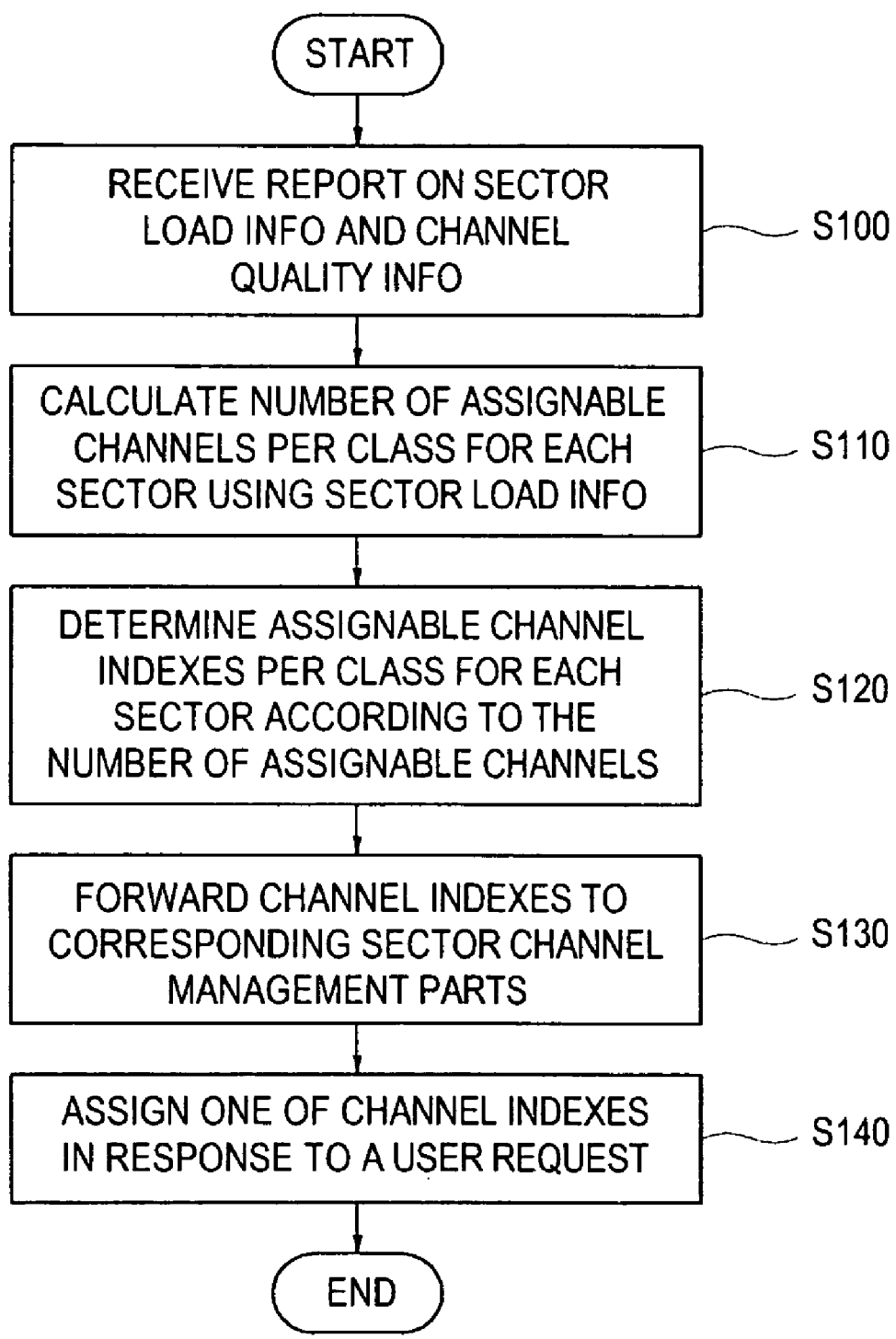
FIG. 10 is a flow chart illustrating a sub-channel assignment method of an OFDMA system according to one exemplary embodiment of the present invention.

FIG. 10 is a flow chart illustrating a sub-channel assignment method of an OFDMA system according to one exemplary embodiment of the present invention. Referring to FIG. 10, the channel assignment scheduler 120 of sub-channel assignment apparatus 100 of an OFDMA system according to an exemplary embodiment of the present invention receives reports from each sector management part 110*a*, 110*b*, 110*c* on sector load information regarding the number of channel assignment requests of users in the sector managed by each sector channel management part 110*a*, 110*b*, 110*c* and channel quality information including the signal to noise ratio of the channels currently in use (S100). Preferably, the numbers of assigned channels per class of each sector are classified by the sectors to be assigned for each of the classes. The number of assignable channels per class for each sector is calculated using the sector load information (S110).

The channel assignment scheduler 120 determines the assignable channel indexes per classes for each sector according to the calculated number of assignable channels per class for each sector and the channel quality information (S120). Then, the channel assignment scheduler 120 forwards the assignable channel indexes to each corresponding sector channel management part 110*a*, 110*b*, 110*c* (S130). Preferably, the assignable channel indexes are sequentially determined, first for the classes with sub-channels assigned to more sectors, according to the calculated number of sub-channels for each class. Further preferably, when the magnitude of the signal to noise ratio according to the channel quality information of the channel is larger than a predetermined threshold, the channel index of the channel is determined as the assignable channel index. Each sector channel management part 110*a*, 110*b*, 110*c* receives the calculated channel index for the corresponding channel and in response to a request from a user in the sector managed by itself, assigns one of the channels having the forwarded assignable channel index (S140). Preferably, the sub-channels are assigned sequentially with the sub-channels of a class with sub-channels assigned to a less number of sectors assigned first.

Figure 11:
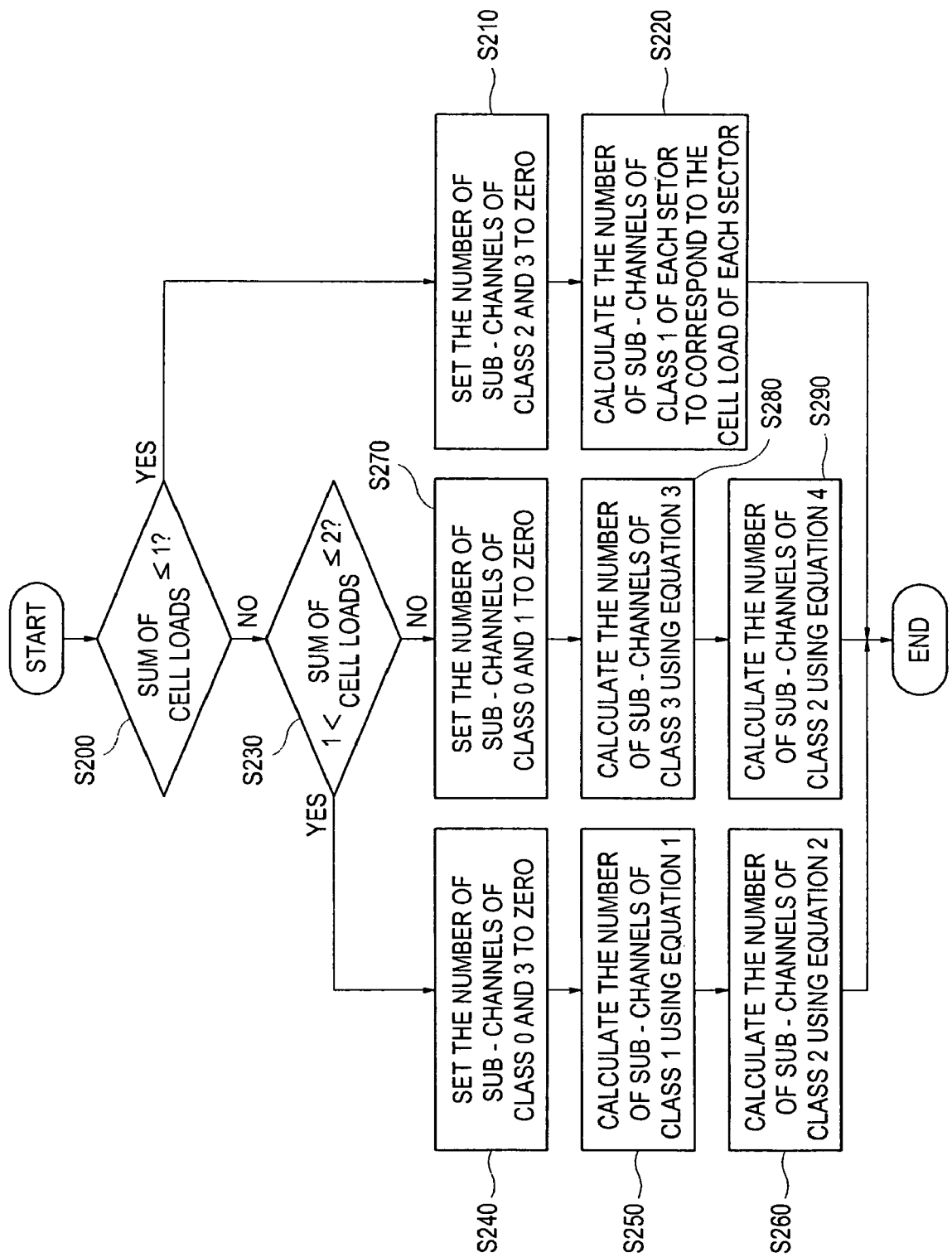
FIG. 11 is a flow chart illustrating a method of calculating the number of assigned channels of an OFDMA system according to an exemplary embodiment of the present invention.

FIG. 11 is a flow chart illustrating a method of calculating the number of assigned channels of an OFDMA system according to an exemplary embodiment of the present invention. Referring to FIG. 11, the channel assignment scheduler 120 of channel assignment apparatus 100 of an OFDMA system according to an exemplary embodiment of the present invention determines whether the sum of cell loads of each sector is smaller than or equal to 1 (S200).

If the sum of cell loads of each cell is determined to be smaller than or equal to 1, then the channel assignment scheduler 120 sets the number of sub-channels of classes 2 and 3 to '0' (S210). Since the total number of channels requested by the sectors is smaller than the number of total assignable channels, there is no need to assign the sub-channels of class 2 or 3. Then, the channel assignment scheduler 120 calculates the number of sub-channels of class 1 for each sector to correspond to the cell load of each sector (S220) and ends the procedure.

If the sum of the cell loads of each cell is determined not to be smaller than or equal to 1, then the channel assignment scheduler 120 determines whether the sum of the cell loads of each cell is larger than 1 but smaller than or equal to 2 (S230). If the sum of cell loads of each cell is determined to be larger than 1 but smaller than or equal to 2, then the channel assignment scheduler 120 sets the number of sub-channels of class 0 and 3 to '0' (S240). In this instance, the sum of the numbers of channels requested by each sector must be larger than the number of total assignable sub-channels, and there inevitably is a sub-channel multiply assigned to more than 2 sectors. Thus, the number of sub-channels of class 0 is set to '0' so as to avoid the waste of channel resources, while the number of sub-channels of class 3 is set to '0' in order to reduce the interference between the channels.

The channel assignment scheduler 120 uses the aforementioned equation 1 to calculate the number of sub-channels of class 1 (S250). Equation 1 is an equation derived to set the sum of the numbers of sub-channels of the class with the sub-channels assigned to only one sector. This is to maximize the number of sub-channels of class 1, which has the least interference between the channels. Then, the channel assignment scheduler 120 uses the aforementioned equation 2 to calculate the number of sub-channels of class 2 (S260). Equation 2 is an equation derived to set the ratio between the numbers of sub-channels of class 2 with sub-channels assigned to multiple sectors to correspond with the ratio between the numbers of sub-channels of the class 2 with sub-channels assigned to one sector.

If the sum of cell loads of each cell is determined to be larger than 1 but smaller or equal to 2, then the channel assignment scheduler 120 sets the number of sub-channels of classes 0 and 1 to '0' (S270). In this instance, there inevitably must be a sub-channel of class 3 (group of sub-channels multiply assigned to all 3 sectors). Also, since the number of sub-channels of class 3 increases when there is a sub-channel of class 1, the number of sub-channels of class 1 is set to '0'.

The channel assignment scheduler 120 uses the aforementioned equation 3 to calculate the number of sub-channels of class 3 (S280). Then, the channel assignment scheduler 120 uses aforementioned equation 4 to calculate the number of sub-channels of class 2 (S290) and aborts the procedure.

Equations 3 and 4 calculate the number of channels assigned per class for each sector by using the ratio of the cell load of each sector to maximize the number of sub-channels of class 2, thereby minimizing the number of sub-channels of class 3.

While the preferred embodiment of the present invention has been described as a certain method for calculating the number of assigned channels and for determining channels indexes, there exists many variations to the method described, according to the policy on how to manage the quality of the channels provided to the users, such variations being within the scope of the present invention. While the present invention has been described with respect to embodiments illustrated in the figures, these only serve for illustrative purposes only, and those skilled in the art will understand that various modifications and equivalent embodiments can be made. Therefore, the true technical scope of the present invention should be determined by the technical idea of the appended claims.

What is claimed is:

1. An apparatus capable of assigning sub-channels in an Orthogonal Frequency Division Multiplexing Access (OFDMA) system with a plurality of sectors, comprising:

a plurality of sector channel management parts, each sector channel management part assigning channels having assignable channel indexes in response to requests from users in a sector managed by the respective sector channel management part, and reporting sector load information regarding a total number of the requests from the users in the sector and channel quality information that includes signal to noise ratios for each of the channels currently in use; and a channel assignment scheduler, the channel assignment scheduler using the sector load information and the channel quality information reported from each of the channel management parts to calculate a number of assignable channels per class for each of the sectors, to determine the assignable channel indexes per class for each of the sectors according to the number of assignable channels, and to forward the assignable channel indexes to each of the sector channel management parts.

wherein said class is a group consisting of channels to be assigned to a same number of sectors, and wherein each of the sector channel management parts generates and reports the sector load information on every frame, and wherein the channel assignment scheduler generates the assignable channel indexes for each of the sectors for every frame and forwards the assignable channel indexes to each of the sector channel management parts.

2. An apparatus capable of assigning sub-channels in an Orthogonal Frequency Division Multiplexing Access (OFDMA) system with a plurality of sectors, comprising:

a plurality of sector channel management parts, each sector channel management part assigning channels having assignable channel indexes in response to requests from users in a sector managed by the respective sector channel management part, and reporting sector load information regarding a total number of the requests from the users in the sector and channel quality information that includes signal to noise ratios for each of the channels currently in use; and a channel assignment scheduler, the channel assignment scheduler using the sector load information and the channel quality information reported from each of the channel management parts to calculate a number of assignable channels per class for each of the sectors, to determine the assignable channel indexes per class for each of the sectors according to the number of assignable channels, and to forward the assignable channel indexes to each of the sector channel management parts, wherein said class is a group consisting of channels to be assigned to a same number of sectors, and the channel assignment scheduler calculates the number of assignable channels to set the number of sub-channels of a class with sub-channels not assigned to any of the sectors to 0 and to maximize the number of sub-channels of a class with sub-channels assigned to all of the sectors.

3. An apparatus capable of assigning sub-channels in an Orthogonal Frequency Division Multiplexing Access (OFDMA) system with a plurality of sectors, comprising:

a plurality of sector channel management parts, each sector channel management part assigning channels having assignable channel indexes in response to requests from users in a sector managed by the respective sector channel management part, and reporting sector load information regarding a total number of the requests from the users in the sector and channel quality information that includes signal to noise ratios for each of the channels currently in use; and a channel assignment scheduler, the channel assignment scheduler using the sector load information and the channel quality information reported from each of the channel management parts to calculate a number of assignable channels per class for each of the sectors, to determine the assignable channel indexes per class for each of the sectors according to the number of assignable channels, and to forward the assignable channel indexes to each of the sector channel management parts, wherein said class is a group consisting of channels to be assigned to a same number of sectors, and the channel assignment scheduler calculates the number of assignable channels to set the number of sub-channels of a class with sub-channels not assigned to any of the sectors to 0 and to minimize the number of sub-channels of a class with sub-channels assigned to all of the sectors.

4. The apparatus of claim 3, wherein when the sector load information indicates that a sum of the cell loads for each of the sectors is smaller than or equal to 1, the channel assignment scheduler calculates the number of assignable channels per class for each of the sectors such that the number of sub-channels of a class with sub-channels assigned to multiple sectors is set to 0 and a ratio of the numbers of sub-channels of a class with sub-channels assigned to only one sector among the plurality of sectors corresponds to a ratio of the cell loads of each of the sectors.

5. The apparatus of claim 3, wherein when the sector load information indicates that the sum of the cell loads of each of the sectors is greater than one and smaller than or equal to 2, the channel assignment scheduler calculates the number of assignable channels per class for each sector such that a ratio of the numbers of sub-channels of a class with sub-channels assigned to only one sector among the plurality of sectors corresponds to a ratio of the cell loads of each of the sectors, and a ratio of the numbers of sub-channels of a class with sub-channels assigned to multiple sectors among the plurality of sectors corresponds to the ratio of the numbers of sub-channels of a class with sub-channels assigned to only one sector among the plurality of sectors.

6. The apparatus of claim 3, wherein when the sector load information indicates that the sum of the cell loads of each of the sectors is greater than 2 but smaller than or equal to 3, the channel assignment scheduler calculates the number of channels assignable per class for each of the sectors using a ratio of the cell loads of each of the sectors to maximize the number of sub-channels of a class with sub-channels assigned to 2 sectors.

7. A method of assigning sub-channels in an Orthogonal Frequency Division Multiplexing Access (OFDMA) system, comprising:
receiving reports from each of a plurality of sector channel management parts on sector load information regarding a number of channel assignment requests from users in sectors managed by each of the sector channel management parts and channel quality information that includes signal to noise ratios for each of the channels currently in use,
calculating a number of assignable channels per class for each of the sectors by using the sector load information and the channel quality information of each of the sectors,
determining assignable channel indexes per class for each of the sectors according to the number of assignable channels per class for each of the sectors, and
forwarding each of the assigned channel indexes to each corresponding sector channel management part,
wherein the class is a group consisting of channels assigned to a same number of sectors, and wherein the calculating the number of assignable channels calculates the number of assignable channels such that a number of sub-channels of a class with sub-channels not assigned to any of the sectors is set to 0 and the number of sub-channels of a class with sub-channels assigned to all of the sectors is set to a maximum.

8. A method of assigning sub-channels in an Orthogonal Frequency Division Multiplexing Access (OFDMA) system, comprising:
receiving reports from each of a plurality of sector channel management parts on sector load information regarding a number of channel assignment requests from users in sectors managed by each of the sector channel management parts and channel quality information that includes signal to noise ratios for each of the channels currently in use,
calculating a number of assignable channels per class for each of the sectors by using the sector load information and the channel quality information of each of the sectors,
determining assignable channel indexes per class for each of the sectors according to the number of assignable channels per class for each of the sectors, and
forwarding each of the assigned channel indexes to each corresponding sector channel management part,
wherein the class is a group consisting of channels assigned to a same number of sectors, and wherein the calculating the number of assignable channels calculates the number of assignable channels such that a number of sub-channels of a class with sub-channels not assigned to any of the sectors is set to 0 and the number of sub-channels of a class with sub-channels assigned to all of the sectors is set to a minimum.

9. The method of claim 8, wherein when the sector load information indicates that a sum of the cell loads for each of the sectors is smaller than or equal to 1, the calculating the number of assignable channels calculates the number of assignable channels per class for each of the sectors such that the number of sub-channels of a class with sub-channels assigned to multiple sectors is set to 0 and a ratio of the number of sub-channels of a class with sub-channels assigned to only one sector among the plurality of sectors corresponds to a ratio of the cell loads of each of the sectors.

10. The method of claim 8, wherein when the sector load information indicates that a sum of the cell loads of each of the sectors is greater than one and smaller than or equal to 2, the calculating the number of assignable channels calculates the number of assignable channels per class for each sector such that a ratio of the number of sub-channels of a class with sub-channels assigned to only one sector among the plurality of sectors corresponds to a ratio of the cell loads of each of the sectors, and a ratio of the number of sub-channels of a class with sub-channels assigned to multiple sector among the plurality of sectors corresponds to the ratio of the number of sub-channels of a class with sub-channels assigned to only one sector among the plurality of sectors.

11. The method of claim 10, wherein, when 3 sectors (sector A, sector B, sector C) exist, the calculating the number of assignable channels calculates the numbers of sub-channels of a class with sub-channels assigned to only one sector using the equations (1), (2) and (3):

$$Sa = \frac{Wa(2 - (Wa + Wb + Wc))}{Wa + Wb + Wc}, \tag{1}$$

$$Sb = \frac{Wb(2 - (Wa + Wb + Wc))}{Wa + Wb + Wc}, \tag{2}$$

$$Sc = \frac{Wc(2 - (Wa + Wb + Wc))}{Wa + Wb + Wc} \tag{3}$$

(where, Sa, Sb, Sc is the number of sub-channels of each of the sectors A, B, and C respectively, and Wa, Wb, Wc is a cell load of sectors A, B, and C respectively),
and said calculating the number of assignable channels calculates the numbers of sub-channels of a class with sub-channels assigned to two sectors using the equations (4), (5) and (6):

$$Sab=Sba=1-(Sa+Sb+Wc), \tag{4}$$

$$Sbc=Scb=1-(Sb+Sc+Wa), \tag{5}$$

$$Sca=Sac=1-(Sc+Sa+Wb) \tag{6}$$

(where, Sab, Sba are the numbers of sub-channels multiply assigned to sectors A and B, Sbc, Scb are the numbers of sub-channels multiply assigned to sectors B and C, Sca, Sac are the numbers of sub-channels multiply assigned to sectors C and A).

12. The method of claim 8, wherein when the sector load information indicates that a sum of the cell loads of each of the sectors is greater than 2 and smaller than or equal to 3, the calculating the number of assignable channels calculates the number of channels assignable per class for each of the sectors using a ratio of the cell loads of each of the sectors to maximize the number of sub-channels of a class with sub-channels assigned to 2 sectors.

13. The method of claim 10, wherein, when 3 sectors (sector A, sector B, sector C) exist, the calculating the number of assignable channels calculates the numbers of sub-channels of a class with sub-channels assigned to all the sectors (Class 3) using equations (7), (8) and (9):

$$Ta = \frac{Wa(Wa+Wb+Wc-2)}{Wa+Wb+Wc}, \quad (7)$$

$$Tb = \frac{Wb(Wa+Wb+Wc-2)}{Wa+Wb+Wc}, \quad (8)$$

$$Tc = \frac{Wc(Wa+Wb+Wc-2)}{Wa+Wb+Wc} \quad (9)$$

(where, Ta, Tb, Tc are the number of sub-channels of class 3 for each of the sectors A, B, C respectively, and Wa, Wb, Wc are a cell load of each of the sectors A, B, C respectively), and the calculating the number of assignable channels calculates the numbers of sub-channels of a class with sub-channels assigned to two sectors using the equations (10), (11) and (12):

$$Sab = Sba = \frac{Wa+Wb-Wc-(Ta+Tb+Tc)}{2}, \quad (10)$$

$$Sbc = Scb = \frac{Wb+Wc-Wa-(Ta+Tb+Tc)}{2}, \quad (11)$$

$$Sca = Sac = \frac{Wc+Wa-Wb-(Ta+Tb+Tc)}{2} \quad (12)$$

(where, Sab, Sba are the numbers of sub-channels multiply assigned to sector A and B, Sbc, Scb are the numbers of sub-channels multiply assigned to sectors B and C, Sca, Sac are the numbers of sub-channels multiply assigned to sectors C and A).

\* \* \* \* \*